(12) United States Patent
Stauffer et al.

(10) Patent No.: US 7,839,411 B2
(45) Date of Patent: *Nov. 23, 2010

(54) VIRTUALIZATION OF GRAPHICS RESOURCES

(75) Inventors: John Stauffer, Morgan Hill, CA (US); Bob Beretta, South Lake Tahoe, CA (US); Ken Dyke, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/496,866

(22) Filed: Jul. 31, 2006

(65) Prior Publication Data

US 2006/0262124 A1   Nov. 23, 2006

Related U.S. Application Data

(60) Continuation of application No. 10/964,873, filed on Oct. 13, 2004, now Pat. No. 7,705,853, which is a division of application No. 10/042,882, filed on Jan. 8, 2002, now Pat. No. 6,809,735.

(51) Int. Cl.
   *G06F 12/10* (2006.01)
   *G06F 13/00* (2006.01)
   *G06F 15/16* (2006.01)

(52) U.S. Cl. ................. 345/568; 345/536; 345/502

(58) Field of Classification Search ............ 345/568, 345/530, 501, 522, 547, 502, 536, 537, 557
   See application file for complete search history.

(56) References Cited

U.S. PATENT DOCUMENTS

| 5,113,180 | A | 5/1992 | Gupta et al. | |
|---|---|---|---|---|
| 5,471,672 | A | 11/1995 | Reddy et al. | |
| 5,491,813 | A | 2/1996 | Bondy et al. | |
| 5,757,385 | A | 5/1998 | Narayanaswami et al. | 345/505 |
| 5,802,590 | A * | 9/1998 | Draves | 711/164 |
| 5,832,289 | A | 11/1998 | Shaw et al. | 712/30 |
| 5,842,015 | A | 11/1998 | Cunniff et al. | 718/104 |
| 6,005,851 | A | 12/1999 | Craddock et al. | 370/329 |
| 6,075,546 | A * | 6/2000 | Hussain et al. | 345/522 |
| 6,170,047 | B1 * | 1/2001 | Dye | 711/170 |
| 6,181,346 | B1 * | 1/2001 | Ono et al. | 345/582 |
| 6,188,381 | B1 | 2/2001 | van der Wal et al. | |
| 6,232,990 | B1 | 5/2001 | Poirion | |
| 6,236,413 | B1 | 5/2001 | Gossett et al. | |
| 6,269,102 | B1 | 7/2001 | Hayashi | |
| 6,397,263 | B1 | 5/2002 | Hancock et al. | 709/322 |
| 6,408,386 | B1 | 6/2002 | Hammond et al. | 712/244 |
| 6,437,788 | B1 | 8/2002 | Milot et al. | |

(Continued)

OTHER PUBLICATIONS

Owens, John D. et al, Polygon Rendering on a Stream Architecture, Siggraph/Eurographics Workshop on Graphics Hardware, ACM Press, NY, NY, Aug. 2000, pp. 23-32.

(Continued)

*Primary Examiner*—Joni Hsu
(74) *Attorney, Agent, or Firm*—Blakely, Sokoloff, Taylor & Zafman LLP

(57) ABSTRACT

Graphics resources are virtualized through an interface between graphics hardware and graphics clients. The interface allocates the graphics resources across multiple graphics clients, processes commands for access to the graphics resources from the graphics clients, and resolves conflicts for the graphics resources among the clients.

32 Claims, 8 Drawing Sheets

U.S. PATENT DOCUMENTS

| | | | |
|---|---|---|---|
| 6,467,075 B1 | 10/2002 | Sato et al. | |
| 6,476,808 B1 | 11/2002 | Kuo et al. | |
| 6,549,996 B1 * | 4/2003 | Manry et al. | 711/203 |
| 6,573,846 B1 | 6/2003 | Trivedi et al. | |
| 6,633,564 B1 | 10/2003 | Steer et al. | 370/389 |
| 6,658,564 B1 | 12/2003 | Smith et al. | 713/100 |
| 6,697,076 B1 | 2/2004 | Trivedi et al. | |
| 6,724,767 B1 | 4/2004 | Chong et al. | 709/238 |
| 6,867,781 B1 | 3/2005 | Van Hook et al. | |
| 7,136,068 B1 * | 11/2006 | Priem et al. | 345/503 |
| 2002/0032850 A1 | 3/2002 | Kauffman | 712/31 |
| 2002/0052914 A1 | 5/2002 | Zalewski et al. | 709/203 |
| 2002/0101427 A1 | 8/2002 | Nguyen et al. | 345/531 |
| 2002/0152331 A1 | 10/2002 | Wong et al. | 709/321 |
| 2003/0001840 A1 | 1/2003 | Spitzer et al. | 345/420 |
| 2003/0115476 A1 | 6/2003 | McKee | |
| 2003/0131147 A1 | 7/2003 | Wilt et al. | 709/321 |
| 2003/0140179 A1 | 7/2003 | Wilt et al. | 709/321 |
| 2004/0160449 A1 | 8/2004 | Gossalia et al. | |

OTHER PUBLICATIONS

AGP Accelerated Graphics Port, Accelerated Graphics Port Interface Specification, Revision 2.0, Intel Corporation, May 4, 1998, coversheet, pp. 2 and 23-29.

AGP Accelerated Graphics Port, Draft AGP V3.0 Interface Specification, Revision: 0.95, Original Date: May 2001, Intel Corporation, coversheet and pp. 33-36.

The Design of the OpenGL Graphics Interface, Mark Segal, Kurt Akeley, Silicon Graphics Computer Systems, 1994, pp. 1-10.

* cited by examiner

VIRTUALIZATION OF GRAPHICS RESOURCES

RELATED APPLICATIONS

This application is a continuation of U.S. patent application Ser. No. 10/964,873, filed on Oct. 13, 2004 now U.S. Pat. No. 7,705,853, which is a divisional of U.S. patent application Ser. No. 10/042,882, filed on Jan. 8, 2002, now issued as U.S. Pat. No. 6,809,735. The present application is also related to U.S. patent application Ser. Nos. 10/043,018 and 10/042,901, filed concurrently with and assigned to the same assignee as the present application.

FIELD OF THE INVENTION

This invention relates generally to computer graphics, and more particularly to virtualizing resources for computer graphics.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999-2002, Apple Computer, Inc., All Rights Reserved.

BACKGROUND OF THE INVENTION

A graphics kernel driver typically interfaces between graphics client drivers and graphics hardware to assign graphics resources to each client driver and to administer the submission of graphics commands to the graphics hardware. Each client driver has explicit knowledge of the graphics resources it is assigned and references the resources in its commands using the physical address of the resources. As more sophisticated graphics features are developed, the demand for graphics resources is ever increasing but the graphics resources are limited by the graphics hardware and other system constraints. The assigned resources cannot be shared among clients because the graphics hardware is not designed to handle resource contention among the clients. Additionally, the client drivers are required to manage their own internal resource conflicts. For example, they must handle their attempts to use more than available graphics memory.

SUMMARY OF THE INVENTION

Graphics resources are virtualized through an interface between graphics hardware and graphics clients. The interface allocates the graphics resources across multiple graphics clients, processes commands for access to the graphics resources from the graphics clients, and resolves conflicts for the graphics resources among the clients.

In one aspect, the interface is a graphics kernel that assigns an identifier to a resource when allocated by a graphics client and the client uses the identifier instead of an address for the resource when requesting access to the resource.

Because the native command structure for the graphics hardware is unaffected by the virtualization, neither the applications nor the hardware require modification to operate in conjunction with the present invention. Furthermore, because the virtualized resources appear as unlimited resources to the graphics clients, the clients can be simplified since, for example, they are no longer required to de-fragment or compact their assigned resources.

The present invention describes systems, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
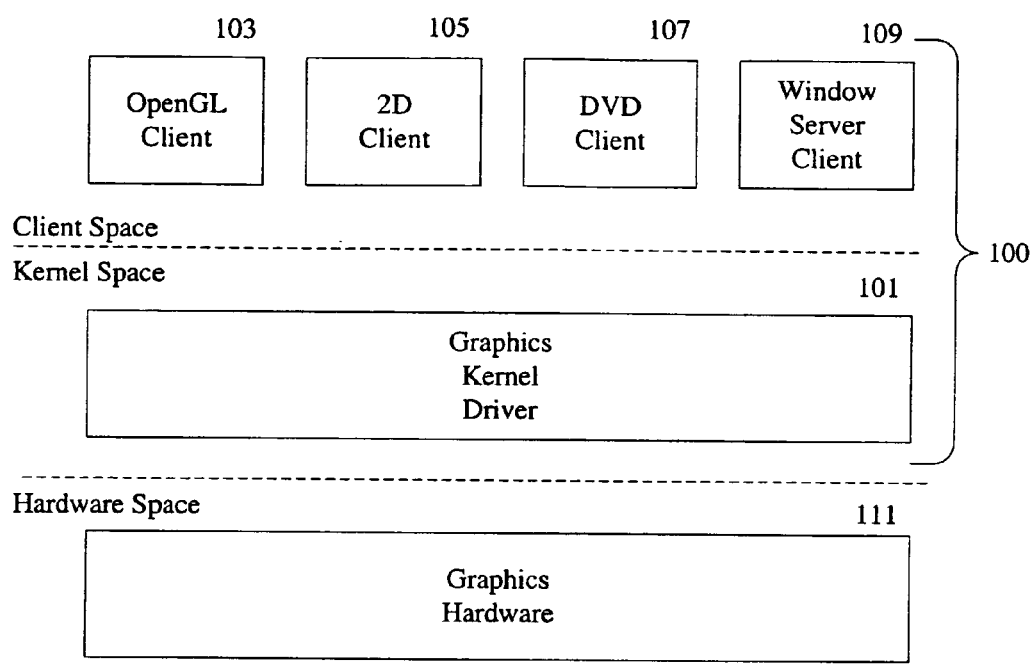
FIG. 1A is a diagram illustrating a graphics driver stack that incorporates the present invention.

In one embodiment, the present invention is integrated into a graphics driver stack 100 as illustrated in FIG. 1A. A graphics kernel driver 101 interfaces between graphics client drivers 103, 105, 107, 109 and graphics hardware 111 to virtualize limited graphics resources used by the graphics hardware 111 and manage contention among the client drivers for the resources. The virtualized resources appear as unlimited resources to the client drivers, which allows the client drivers to be simplified since, for example, they are no longer required to de-fragment or compact their assigned memory.

Graphics resources eligible for virtualization include any limited resource used by the graphics hardware 111, such as graphics memory, either integrated in the graphics hardware 111 or allocated in system memory, GART (graphics address re-mapping table) entries, memory apertures for accessing video memory or registers, specialized memory areas for hierarchical depth buffers, among others. For the sake of clarity, the virtualization of graphics memory is used as an example throughout, but the invention is not so limited.

Figure 1B:
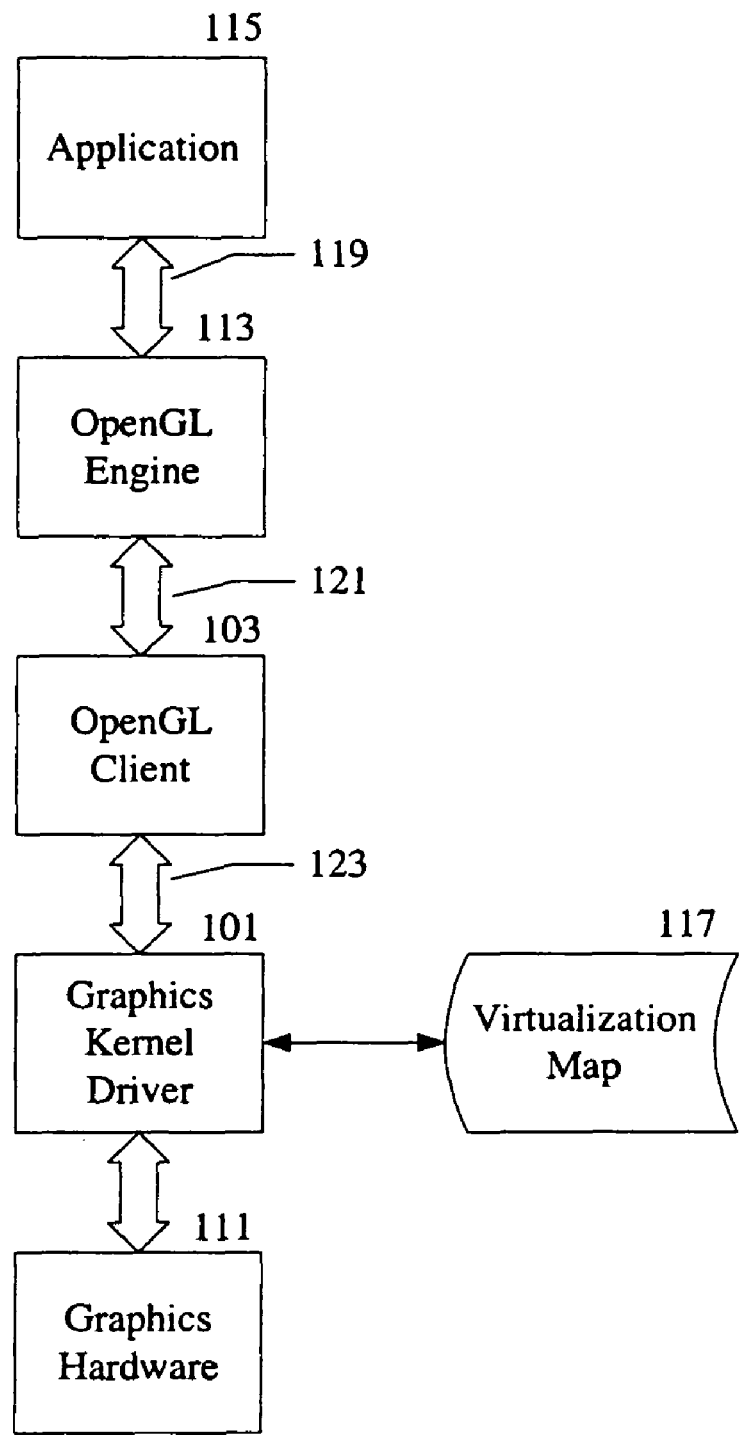
FIG. 1B is a diagram illustrating a system overview of one embodiment of processing in the driver stack of FIG. 1A.

Referring now to an exemplary embodiment shown in FIG. 1B, the kernel driver 101 manages the allocation of memory among clients through a virtualization map 117, such as a range allocation table. The virtualization map 117 indicates how graphics memory is currently allocated, including which block a client is using.

An application 115 calls an OpenGL engine 113 through an OpenGL API (application program interface) 119 to create an image. The OpenGL engine 113, executing on the central processing unit (CPU) of the computer, determines how to divide the image processing work between the CPU and the graphics processor of the graphics hardware 111, and sends the commands to be processed by the graphics processor to the OpenGL client driver 103 through a client driver API 121. The client driver 103, also executing on the CPU, evaluates the commands and determines that it needs graphics memory to create the image. The client driver 103 requests a block of memory from the kernel driver 101 through a kernel driver API call 123. The kernel driver 101, executing on the graphics processor, records the request in an entry in the virtualization map 117, and associates an identifier with the entry. The kernel driver 101 returns the identifier to the client driver 103 for use in all commands that access the memory block. Because the native command structure for OpenGL and the graphics hardware is unaffected by the virtualization, neither the application 115, the OpenGL engine 113, nor the hardware 111 require modification to operate in conjunction with the present invention.

In one embodiment, the kernel driver 101 performs the actual physical allocation of memory when the client driver 103 submits a command that references the identifier. In another embodiment, the kernel driver 101 physically allocates the memory upon receiving the allocation request. In either case, when all physical memory is already allocated, the kernel driver 101 pages a corresponding amount of data currently in memory to a backing store and updates the virtualization map 117. The kernel driver 101 uses the virtualization map 117 to determine how to page the data back into memory for subsequent processing. Details of the paging are described further below in conjunction with FIG. 4B.

In one embodiment, the identifier is a "token" that represents the memory block and the client driver 103 creates tokenized commands by substituting the token for the memory address. When the client driver 103 submits a tokenized command to the graphics hardware 111, the kernel driver 101 extracts the token, finds the address of the memory block represented by the token in the virtualization map 117, and replaces the token with the real address. When the tokenized commands are submitted as part of a standard graphics command stream, the kernel driver 101 must parse the stream into its individual commands and evaluate most, if not all, the commands to determine which contain tokens. This can be a slow and expensive operation.

Figure 2A:
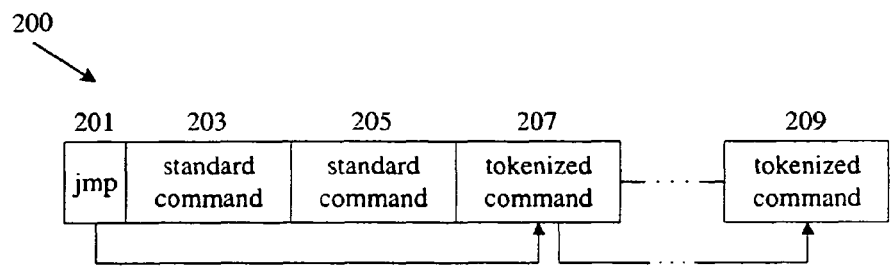
FIGS. 2A-B illustrate graphics command streams according to one embodiment of the invention.
Figure 2B:
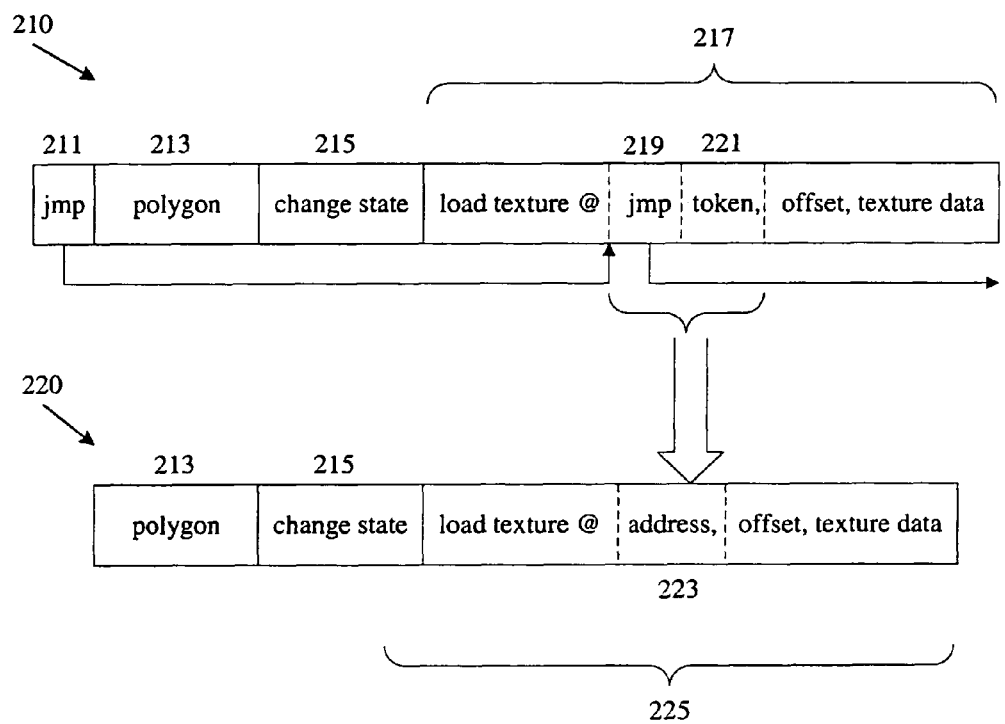

Therefore, in another embodiment, the client driver 103 formats the command stream as illustrated in FIG. 2B. A command stream 200 contains standard commands 203, 205, followed by a tokenized command 207, followed by various other commands, and terminates with a tokenized command 209. The stream 200 is prefaced with a "jump" packet 201 that points to the first tokenized command 207 in the stream 200. The tokenized command 207 contains another jump packet that points to the next tokenized command in the stream 200, and so on until the last jump packet in the stream is reached. The jump packets thus create a linked list of tokenized commands, allowing the kernel driver 101 to ignore the standard commands in the stream 200 without having to evaluate each command individually.

In one embodiment, the jump packets contain a packet type and an offset value relative to the current packet. Assuming a command stream 210 as illustrated in FIG. 2B, the kernel driver 101 reads the first command in the stream, which is a "start" jump packet 211. The kernel driver 101 extracts the offset value from the start jump packet 211 and deletes the packet from the stream. The kernel driver 101 uses the offset value to jump to the next jump packet 219, which is in the "load texture" command 217. The kernel driver 101 extracts the next offset value and packet type from the jump packet 219. The packet type identifies the packet 219 as a "texture" packet, indicating that the token 221 represents a block of memory containing texture data. The kernel driver 101 replaces the tokenized command 217 with a valid graphics command 225 containing the memory address 223 corresponding to the token 221, and jumps to the jump packet in the next tokenized command in the stream. The resulting stream 220 received by the graphics hardware 111 contains "polygon" 213 and "change state" 215 commands unchanged from the stream 210 submitted by the client driver 103, and a "load texture" command 225 as modified by the kernel driver 101. Thus, the final processing of the command stream by the kernel driver only requires each jump packet to be read and written to and from memory while the majority of the command data generated by the client driver is not read or interpreted by the kernel driver.

Alternate embodiments in which the jump packets are not embedded in the tokenized commands in the stream or are submitted as a separate stream associated with the command stream are contemplated as within the scope of the invention.

When a particular region of graphics memory requested by a current client driver has been reused by a previous client driver, the kernel driver completes the use of the memory by the previous client driver, and prepares the resource for use by the current client driver. When the kernel driver processes a tokenized command, the graphics memory referenced by the token may be in one of two states: valid for immediate use by the client driver or not. If the memory is valid for immediate use, the kernel driver proceeds as previously described. If the memory is not valid for immediate use, the kernel driver refreshes the current client's data by allocating a new region of graphics memory and page the data into it. Before doing this however, the kernel driver submits all graphics commands in the current client's command stream up to the current jump packet to the graphics hardware before it starts allocating the new region of graphics memory for the current client because the process of allocation might result in the deallocation and paging of graphics memory previously referenced in the current command stream. Details of the refreshing of data are described further below in conjunction with FIG. 4B.

Figure 3A:
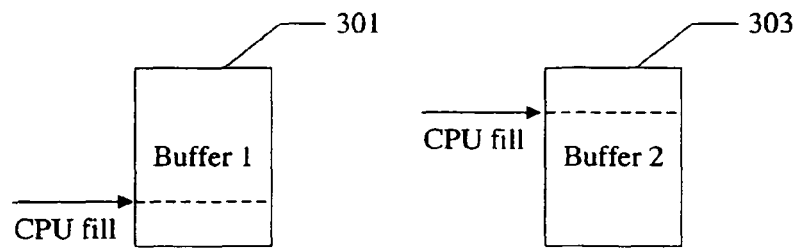
FIG. 3A-C illustrate processing of command buffers according to embodiments of the invention.

Command buffers are commonly used to hold the command streams from multiple clients. As shown in FIG. 3A, as the client driver generates commands, the CPU fills the appropriate buffer 301, 303. When a buffer is full, it is placed in a processing queue for the graphics hardware, and the CPU assigns another buffer to the client driver. It will be appreciated that when jump packets are used, the client driver loads the start jump packet first in the buffer.

The command buffers allow multiple clients to create streams asynchronously to each other. The command buffers also allow the graphics hardware and the CPU to operate asynchronously, keeping both busy even though they typically operate at different speeds.

Figure 3B:
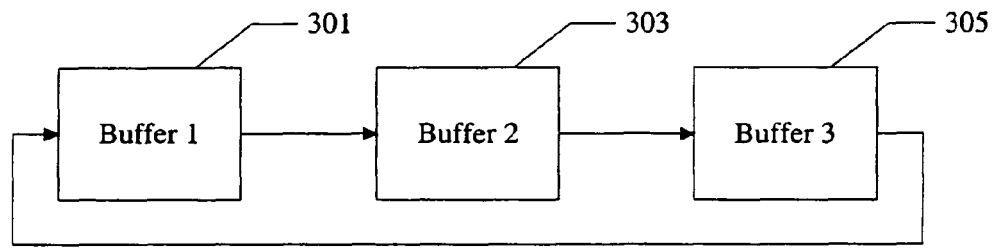

In one embodiment, the queued buffers are arranged as a linked list as shown in FIG. 3B. The contents of the buffers 301, 303, 305 are read by the graphics hardware 111 as a linear stream of commands for execution in a serialized fashion, i.e., all the commands in one buffer are executed before the commands in the next buffer in the queue. The serialized, linear execution by the graphics hardware 111 provides the kernel driver 101 with an memory management timeline to follow in processing the commands that reference graphics memory. After processing by the kernel driver, the entire command stream is valid for consumption by the graphics hardware since the conflicts between clients due to reuse of memory have been resolved and the jump packets and tokenized commands have been replaced with valid graphics hardware commands.

Figure 3C:
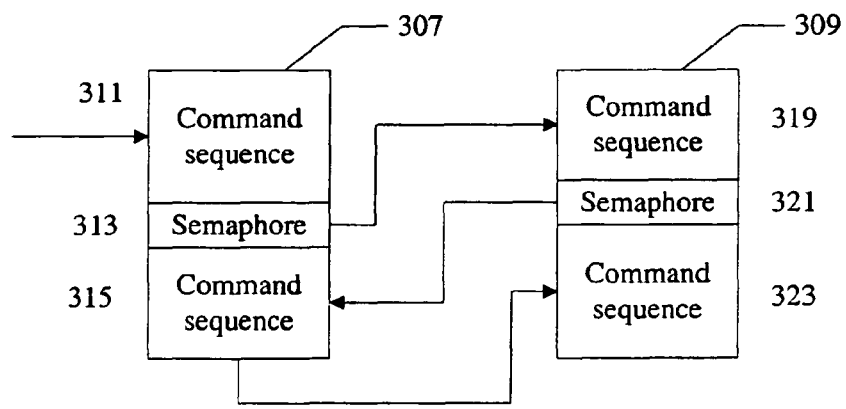

In an alternate embodiment, the identifier for the memory block allocated to the client driver 103 is the physical address of the memory. Because the client expects memory address to be unchanged until it de-allocates the memory, the kernel driver 101 employs special graphics hardware features to manage the virtualization of memory. In one embodiment, the kernel driver 101 uses graphics semaphores that cause the graphics hardware to suspend processing of one buffer and switch to processing another buffer, thus interleaving the processing of the command buffers from different clients, and creating multiple inter-dependent linear timelines as illustrated in FIG. 3C.

For example, assume client A places a command in buffer 307 that references memory also used by client C. When the kernel driver 101 reaches that command in buffer 307, it inserts a reference to semaphore 313 before the command, effectively dividing the buffer 307 into command sequences 311, 315. The graphics hardware 111 processes command sequence 311 in buffer 307 until it reaches semaphore 313, which directs it to switch to processing the next queued buffer 309. While the graphics hardware 111 is processing buffer 309, the kernel driver 101 pages the appropriate data back in and clears the semaphore 313.

Similarly, assume client B places a command in buffer 309 that references memory also used by client D, so the kernel driver 101 inserts a reference to semaphore 321 in buffer 309, creating command sequences 319, 323. When the graphics hardware 111 reaches semaphore 321, it determines that semaphore 313 is clear and resumes processing buffer 307 at command sequence 315. Because the kernel driver 101 has cleared semaphore 321 by the time the graphics hardware finishes processing command sequence 315, the graphics hardware can now process command sequence 323.

Next, the particular methods of the invention are described in terms of computer software with reference to a series of flowcharts. The methods to be performed by a processing system constitute computer programs made up of executable instructions illustrated as blocks (acts). Describing the methods by reference to a flowchart enables one skilled in the art to develop such programs including such instructions to carry out the methods on suitably configured hardware (the processing unit of the hardware executing the instructions from machine-readable media). The executable instructions may be written in a computer programming language or may be embodied in firmware logic. If written in a programming language conforming to a recognized standard, such instructions can be executed on a variety of hardware platforms and interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 4A-B without departing from the scope of the invention and that no particular order is implied by the arrangement of blocks shown and described herein.

Figure 4A:
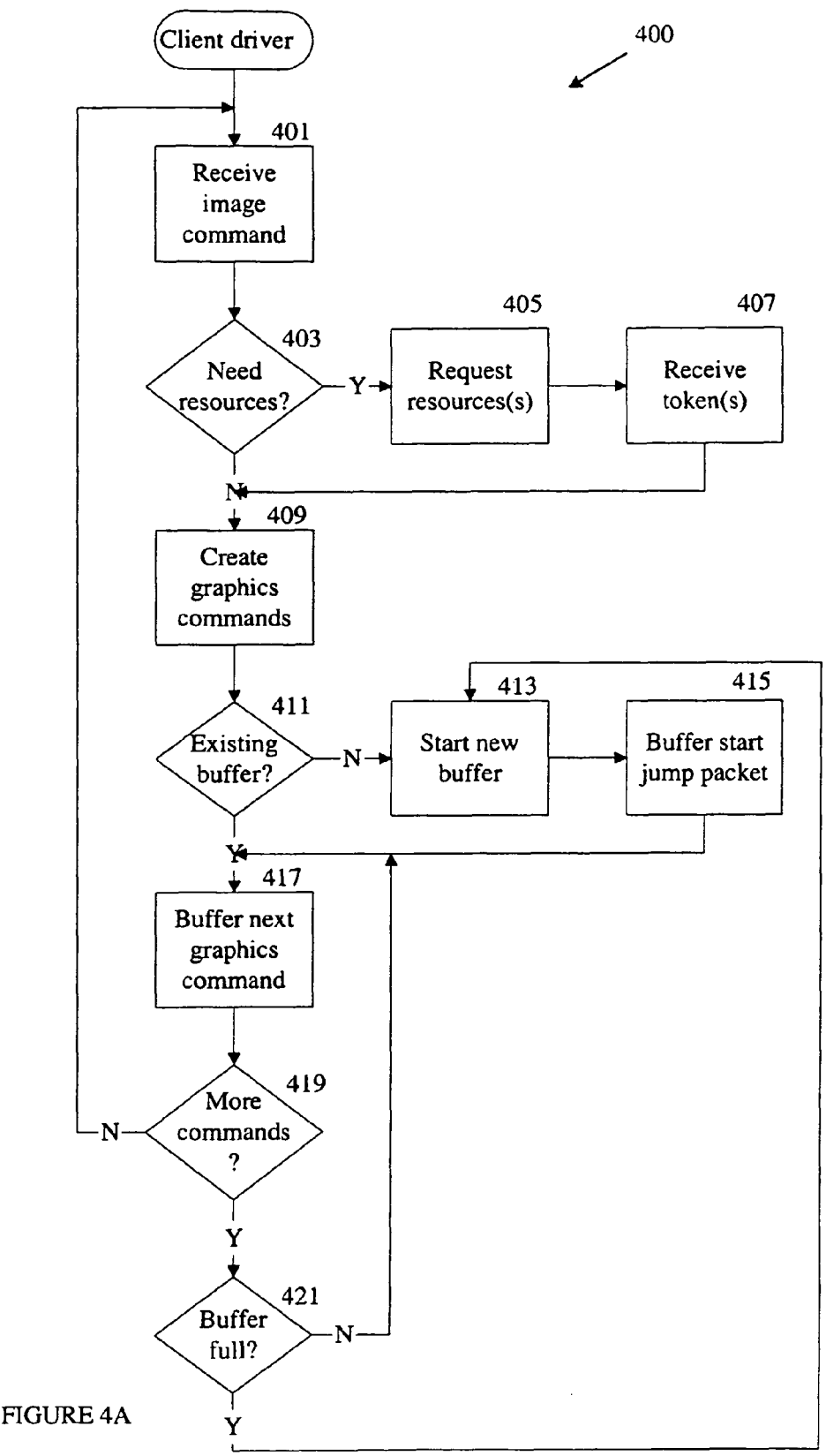
FIG. 4A is a flowchart of a graphics client driver method to be performed by a computer processor according to an embodiment of the invention.

Referring first to FIG. 4A, the acts to be performed by a computer processor executing a client driver method 400 that tokenizes commands are shown. The client driver method 400 receives an image command (block 401) and determines if graphics resources are required to process the command (block 403). If the necessary resources have not been previously allocated, the method 400 requests the resources from the kernel driver (block 405) and receives a token in return (block 407). The method 400 creates the graphics commands to perform the image command at block 409. The processing represented by block 409 includes creating the jump packets with the appropriate offsets and packet types, and inserting the jump packets and tokens in the commands. The particular packet types used by embodiments of the invention are dictated by the command set of the underlying graphics hardware. One exemplary set of packet types, called "op codes," for graphics memory are shown in Table 1.

TABLE 1

| Op Code | Remarks |
| --- | --- |
| kGLStreamStart | Start the stream |
| kGLStreamEnd | Terminate the stream |
| kGLStreamCopyColor | Copy an image between two draw buffers |
| kGLStreamCopyColorScale | Copy an image between two draw buffers with scaling |
| kGLStreamDrawColor | Draw an image to the current draw buffer |
| kGLStreamTexture0 | Set the current texture object on texture unit zero |
| kGLStreamTexture1 | Set the current texture object on texture unit one |
| kGLStreamTexture2 | Set the current texture object on texture unit two |
| kGLStreamTexture3 | Set the current texture object on texture unit three |
| kGLStreamNoTex0 | Remove any texture from texture unit zero |
| kGLStreamNoTex1 | Remove any texture from texture unit one |
| kGLStreamNoTex2 | Remove any texture from texture unit two |
| kGLStreamNoTex3 | Remove any texture from texture unit three |
| kGLStreamVertexBuffer | Set the current vertex object |
| kGLStreamNoVertexBuffer | Remove any current vertex object |

If there is no existing command buffer (block 411), the method 400 starts a new buffer (block 413) and inserts a start jump packet at the beginning of the buffer (block 415) with an offset to the first tokenized command in the buffer. Each graphics command is loaded in the buffer (block 417) until all graphics commands are buffered (block 419) or the current buffer is full (block 421). If the current buffer is full and more commands need to be buffered, the method 400 returns to block 413 to start a new buffer.

Figure 4B:
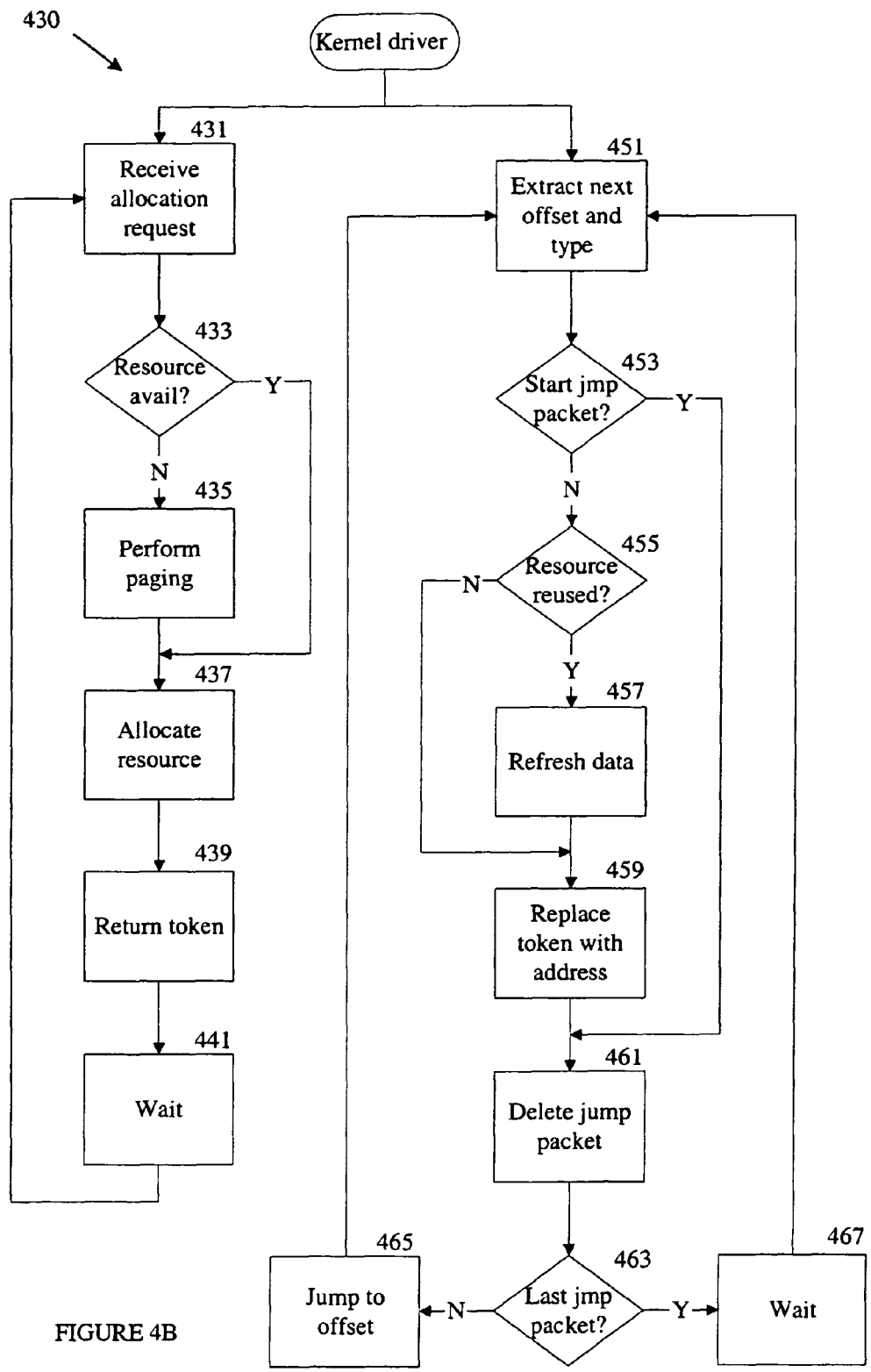
FIG. 4B is a flowchart of a graphics kernel driver method to be performed by a graphics processor according to an embodiment of the invention.

Referring now to FIG. 4B, the acts to be performed by a graphics processor executing a kernel driver method 430 corresponding to the client driver method 400 are shown. The kernel driver method 430 is illustrated as two parallel processing threads, one that interfaces with the client driver (starting at block 431) and one that interfaces with the graphics hardware (starting at block 451). It will be appreciated that the invention is not limited to such parallel processing implementations.

When the method 430 receives an allocation request from a client driver (block 431), it determines if the requested amount of resource is available (block 433). If not, the method 430 pages out a sufficient amount of data belonging to another client (block 435). The method 430 allocates the resource, including assigning a token and updating its memory management information, such as the virtualization map 117 illustrated in FIG. 1B. The token is returned to the requesting client driver at block 439. The client driver method 430 waits until another request is received (block 441) and returns to block 431 to process the new request.

When the client driver submits a buffer of commands to the graphics hardware for processing, the kernel driver method 430 extracts the offset and type from the next jump packet in the buffer (block 451). If the next jump packet is the first jump packet, i.e., a start jump packet (block 453), the method 430 deletes the start jump packet from the buffer (block 461) and jumps to the jump packet defined by the offset (block 465) to continue processing. Otherwise, the method 430 uses the jump packet type to locate the token in the command and determines if the resource corresponding to the token has been reused (block 455). If so, the kernel driver method 430 refreshes the data required by the current command (block 457). Because of the abstraction provided by the token, the kernel driver can page the data into a different available graphics resource or page out the data currently in the original resource and page in the data required by the current command. The token is replaced with the address of the resource (block 459) and the jump packet is deleted (block 461). If the current jump packet is the last in the buffer (block 463), the method 430 waits for another buffer (block 467) and returns to block 451 to process the new buffer. Otherwise, the next jump packet in the buffer is processed.

In an alternate embodiment, the processing represented by block 437 is a logical allocation of the resource to the client driver and the processing represented by blocks 433 through 435 is not performed. The kernel driver method 430 performs the physical allocation, and any necessary paging, when it encounters the first tokenized command that references the resource in the command buffer.

In one embodiment, the kernel driver method 430 uses system memory as its backing store for data that must be paged out of the virtualized graphics resources. The method 430 can request the CPU read the data into system memory, or it can request the graphics hardware to write the data to the system memory. The latter operation can be performed asynchronously with the CPU, but not all graphics hardware may be able to perform the operation or there may be incompatibilities between the graphics hardware and the CPU. When the operating system virtualizes system memory, the operating system may further page the data to mass storage. It will be appreciated that once the data has been written to system memory, a virtual memory operating system may further page the data to mass storage.

In one embodiment, what data to page into system memory is determined by various paging criteria, such as type of graphics resource, priority, and paging algorithm. Some resources, like graphics memory, are very expensive to page because the data contained in the graphics memory often must be copied into system memory. The priorities may be allocated within graphics resources types. For example, texture objects generally have a lower priority than frame buffers when paging graphics memory. Other resources, like GART entries may be paged inexpensively because the paging only requires the modification of the GART table, i.e., no data is actually relocated. Because the relative cost of paging different types of resources is quite different, different paging algorithms are used for each.

For example, when a client driver requests an allocation of graphics memory but there is not enough free contiguous memory to service the request, all graphics memory resources owned by all clients are candidates for paging. The first resources selected are owned by other clients because there may be an arbitrarily long period of time before the other clients are run again. When considering graphics memory owned by the requesting client driver, the kernel driver uses an algorithm that dynamically switches from LRU (least recently used) to MRU (most recently used) based on whether or not the client driver is overcommitted in its texture usage. An overcommitted application is an application that uses more texture memory in rendering a single frame than can be supplied by the graphics hardware. When a client driver that is not overcommitted runs out of graphics memory it is because some user input has caused the client driver to render a new scene so the LRU algorithm is used, based on the assumption that the least recently used memory resources may never be used again. When a client driver that is overcommitted runs out of graphics memory this means that it will do so cyclicly every frame, so the MRU algorithm is chosen because an LRU algorithm would result in every memory resource owned by the client driver being paged one or more times per frame.

GART entry paging is managed differently because the cost of changing GART entries is essentially unrelated to the size of the memory resource. The first candidates for paging are GART entries that may never be used again. For example, graphics memory texture objects each have a GART entry that was used to transfer the texture from system memory to graphics memory. Once the texture has been moved to graphics memory, the GART entry will never be used again unless the texture is paged from graphics memory and then reloaded. Therefore, it is likely that choosing such a GART entry for paging will have no performance cost. The remaining GART entries are categorized from highest to lowest priority for paging, with the lowest priority assigned to the GART entry for each client's command buffer, which must be mapped into GART for the client driver to use the graphics hardware at all.

One of skill in the art will appreciate that other types of graphics resources may have different algorithms for selecting which resources are candidates for paging that allow the resources to be transparently managed with respect to multiple clients as described above for graphics memory and GART.

In one embodiment, the kernel driver method 430 uses a collection of data objects, each of which represents an allocated resource, as a virtualization map. The tokens identify the data objects within the virtualization map. Each data object contains the address range for the corresponding resource. When the data in the resource is paged out, a "dirty" flag is set and a pointer to the backing store holding the data is stored in the object. It will be appreciated that the layer of abstraction between the client and the physical resources provided by the token allows the data to be paged into a resource address different than it previously occupied without the client driver being aware of the change.

Figure 5A:
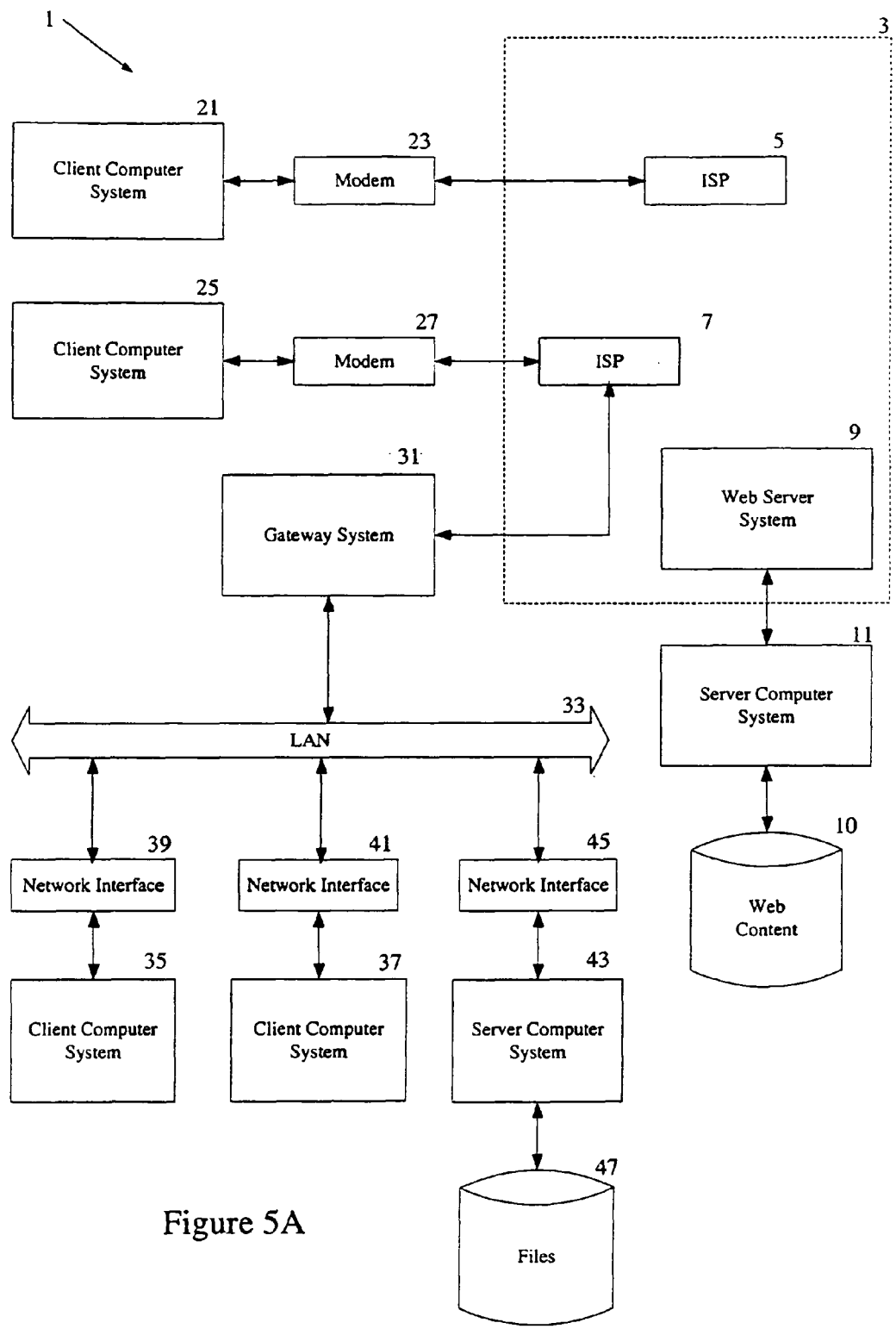
FIG. 5A is a diagram of one embodiment of an operating environment suitable for practicing the present invention.
Figure 5B:
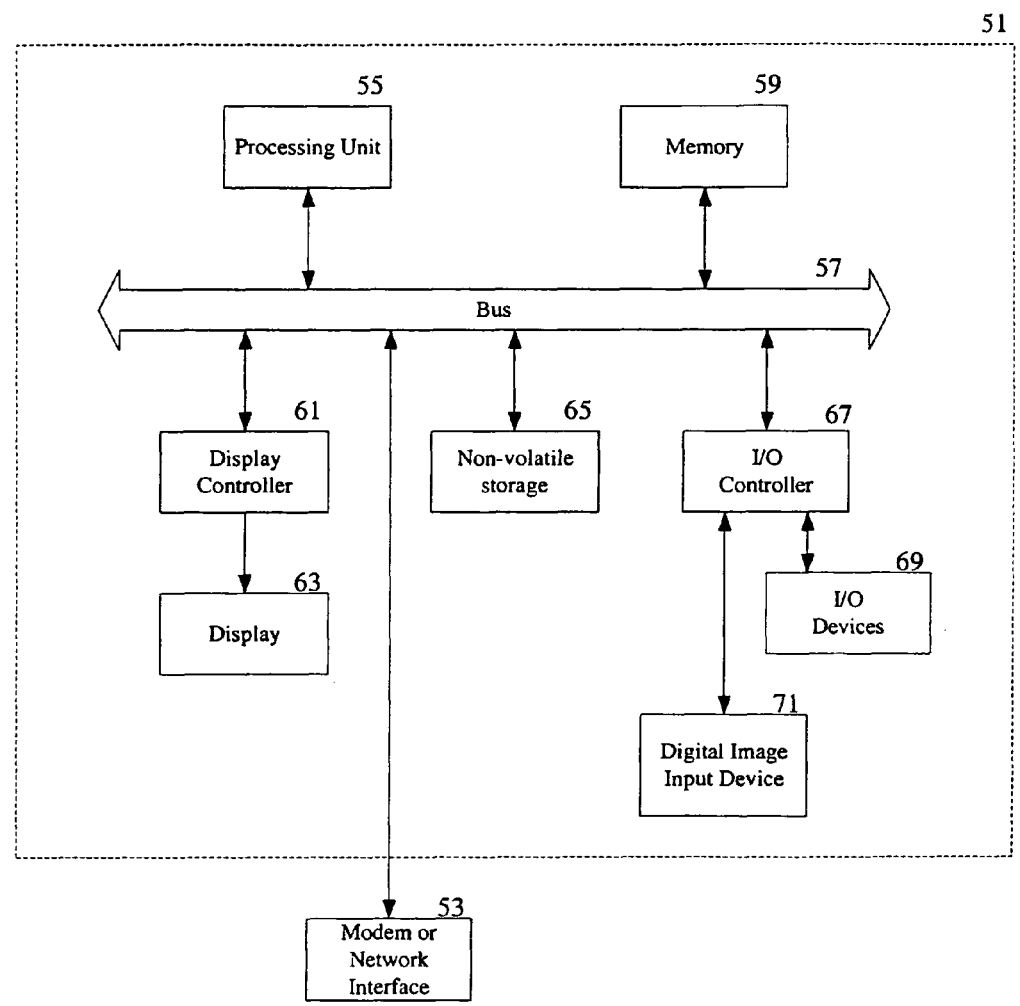
FIG. 5B is a diagram of one embodiment of a computer system suitable for use in the operating environment of FIG. 5A.

The following description of FIGS. 5A-B is intended to provide an overview of computer hardware and other operating components suitable for performing the methods of the invention described above, but is not intended to limit the applicable environments. One of skill in the art will immediately appreciate that the invention can be practiced with other processing system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 5A shows several computer systems that are coupled together through a network 3, such as the Internet. The term "Internet" as used herein refers to a network of networks which uses certain protocols, such as the TCP/IP protocol, and possibly other protocols such as, for example, the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 5A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 5A, the connections are not the same for these three computer systems. Client computer system 25 is coupled through a modem interface 27 while client computer systems 35 and 37 are part of a LAN. While FIG. 5A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 5B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls a display on a display device 63, such as, for example, a cathode ray tube (CRT) or liquid crystal display, in accordance with the present invention. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "machine-readable medium" and "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55.

A Web TV system, which is known in the art, is also considered to be a computer system according to the present invention, but it may lack some of the features shown in FIG. 5B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Mac® OS from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

Virtualization of graphics resources has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. The terminology used in this application with respect to graphics is meant to include all environments that display images to a user. Therefore, it is manifestly intended that this invention be limited only by the following claims and equivalents thereof.

What is claimed is:

1. A computerized method of virtualizing graphics resources comprising:
   receiving, by a graphics kernel, an allocation request for a graphics resource from a graphics client, wherein the graphics resource comprises graphics hardware;
   assigning, by the graphics kernel, a token to represent the graphics resource in a tokenized command;
   returning, by the graphics kernel, the token to the graphics client;
   receiving, by the graphics kernel, the tokenized command from the graphics client, the tokenized command containing the token;
   allocating, by the graphics kernel in response to receiving the tokenized command, the graphics resource to the graphics client;
   linking, by the graphics kernel, the token in the tokenized command with the graphics resource by replacing the token in the tokenized command with an address for the graphics resource, wherein the token is different than the address;
   managing, by the graphics kernel, the graphics resource;
   recording, by the graphics kernel, information about the graphics resource in an entry in a virtualization map; and
   linking, by the graphics kernel, the token to the entry, wherein the graphics kernel uses the virtualization map in allocating and managing graphics resources.

2. The computerized method of claim 1 further comprising:
   locating, by the graphics kernel, the tokenized command in a command stream using an offset specified in a jump packet in the command stream.

3. The computerized method of claim 2, wherein replacing the token further comprises:
   replacing the jump packet.

4. The computerized method of claim 2 further comprising:
   inserting, by the graphics client, the jump packet in the command stream prior to the tokenized command.

5. The computerized method of claim 4 further comprising:
   formatting, by the graphics client, the tokenized command with the token and a next jump packet that specifies an offset to a subsequent next jump packet in the command stream.

6. The computerized method of claim 5, wherein the next jump packet comprises a packet type indicating a type for the graphics resource represented by the token.

7. The computerized method of claim 2, wherein the jump packet comprises a start jump packet type.

8. The computerized method of claim 2 further comprising:
   loading, by the graphics client, the command stream into a buffer, wherein the offset in the jump packet is relative to a beginning of the buffer.

9. The computerized method of claim 2 wherein the offset in the jump packet is relative to a location of the jump packet in the command stream.

10. The computerized method of claim 1, wherein managing the graphics resource comprises:
    determining if the graphics resource is available; and
    paging current data associated with the graphics resource to a backing store if the graphics resource is not available.

11. The computerized method of claim 10, wherein the current data to page is determined using paging criteria.

12. The computerized method of claim 11, wherein the paging criteria is selected from the group consisting of a type of graphics resource, a priority, and a paging algorithm.

13. The computerized method of claim 12, wherein the paging algorithm is based on usage of the graphics resource.

14. The computerized method of claim 1, wherein managing the graphics resource comprises:
    detecting a conflict if the graphics resource represented by the token has been reused; and
    resolving the conflict.

15. The computerized method of claim 14, wherein resolving the conflict comprises:
    determining whether to page current data associated with the graphics resource to a backing store.

16. The computerized method of claim 15 further comprising:
    paging the current data to the backing store; and
    paging data for the graphics client from the backing store into the graphics resource.

17. The computerized method of claim 15 further comprising:
    allocating a like graphics resource to the graphics client;
    paging the data for the graphics client from the backing store into the like graphics resource; and
    re-assigning the token to represent the like graphics resource.

18. The computerized method of claim 15, wherein determining whether to page the current data is based on paging criteria.

19. The computerized method of claim 18, wherein the paging criteria is selected from the group consisting of a type of graphics resource, a priority, and a paging algorithm.

20. The computerized method of claim 18, wherein the paging algorithm is based on usage of the graphics resource.

21. A computerized method of virtualizing graphics resources comprising:
    sending, by a graphics client, an allocation request for a graphics resource to a graphics kernel, wherein the graphics resource comprises graphics hardware;
    receiving, by a graphics client, a token to represent the graphics resource in a tokenized command; and sending, by a graphics client, a tokenized command to the graphics kernel, the tokenized command containing the token, wherein the graphics resource is allocated to the graphics client in response to sending, by the graphics client, the tokenized command and wherein the graphics kernel replaces the token with an address of the graphics resource and wherein the token is different than the address.

22. The computerized method of claim 21, wherein the graphics client cannot distinguish between the token representing the graphics resource and the graphics resource.

23. A machine-readable non-transitory storage medium storing executable instructions to cause a processing system to perform a method of virtualizing graphics resources comprising:
receiving, by a graphics kernel, an allocation request for a graphics resource from a graphics client, wherein the graphics resource comprises graphics hardware;
assigning, by the graphics kernel, a token to represent the graphics resource in a tokenized command;
returning, by the graphics kernel, the token to the graphics client;
receiving, by the graphics kernel, the tokenized command from the graphics client, the tokenized command containing the token;
allocating, by the graphics kernel in response to receiving the tokenized command, the graphics resource to the graphics client;
linking, by the graphics kernel, the token in the tokenized command with the graphics resource by replacing the token in the tokenized command with an address for the graphics resource, wherein the token is different than the address;
managing, by the graphics kernel, the graphics resource;
recording, by the graphics kernel, information about the graphics resource in an entry in a virtualization map; and
linking, by the graphics kernel, the token to the entry, wherein the graphics kernel uses the virtualization map in allocating and managing graphics resources.

24. The machine-readable non-transitory storage medium of claim 23, the method further comprising:
locating, by the graphics kernel, the tokenized command in a command stream using an offset specified in a jump packet in the command stream.

25. The machine-readable non-transitory storage medium of claim 24, wherein replacing the token further comprises:
replacing the jump packet.

26. The machine-readable non-transitory storage medium of claim 24, the method further comprising:
inserting, by the graphics client, the jump packet in the command stream prior to the tokenized command.

27. The machine-readable non-transitory storage medium of claim 26, the method further comprising:
formatting, by the graphics client, the tokenized command with the token and a next jump packet that specifies an offset to a subsequent next jump packet in the command stream.

28. The machine-readable non-transitory storage medium of claim 27, wherein the next jump packet comprises a packet type indicating a type for the graphics resource represented by the token.

29. A machine-readable non-transitory storage medium storing executable instructions to cause a processing system to perform a method of virtualizing graphics resources comprising:
sending, by a graphics client, an allocation request for a graphics resource to a graphics kernel, wherein the graphics resource comprises graphics hardware;
receiving, by a graphics client, a token to represent the graphics resource in a tokenized command; and
sending, by a graphics client, a tokenized command to the graphics kernel, the tokenized command containing the token, wherein the graphics resource is allocated to the graphics client in response to sending, by the graphics client, the tokenized command and wherein the graphics kernel replaces the token with an address of the graphics resource and wherein the token is different than the address.

30. The machine-readable non-transitory storage medium of claim 29, wherein the graphics client cannot distinguish between the token representing the graphics resource and the graphics resource.

31. A data processing system comprising:
means for receiving, by a graphics kernel, an allocation request for a graphics resource from a graphics client, wherein the graphics resource comprises graphics hardware;
means for assigning, by the graphics kernel, a token to represent the graphics resource in a tokenized command;
means for returning, by the graphics kernel, the token to the graphics client;
means for receiving, by the graphics kernel, the tokenized command from the graphics client, the tokenized command containing the token;
means for allocating, by the graphics kernel in response to receiving the tokenized command, the graphics resource to the graphics client;
means for linking, by the graphics kernel, the token in the tokenized command with the graphics resource by replacing the token in the tokenized command with an address for the graphics resource, wherein the token is different than the address;
means for managing, by the graphics kernel, the graphics resource;
means for recording, by the graphics kernel, information about the graphics resource in an entry in a virtualization map; and
means for linking, by the graphics kernel, the token to the entry, wherein the graphics kernel uses the virtualization map in allocating and managing graphics resources.

32. A data processing system comprising:
means for sending, by a graphics client, an allocation request for a graphics resource to a graphics kernel, wherein the graphics resource comprises graphics hardware;
means for receiving, by a graphics client, a token to represent the graphics resource in a tokenized command; and
means for sending, by a graphics client, a tokenized command to the graphics kernel, the tokenized command containing the token, wherein the graphics resource is allocated to the graphics client in response to sending, by the graphics client, the tokenized command and wherein the graphics kernel replaces the token with an address of the graphics resource and wherein the token is different than the address.

* * * * *

UNITED STATES PATENT AND TRADEMARK OFFICE
CERTIFICATE OF CORRECTION

| | | |
|---|---|---|
| PATENT NO. | : 7,839,411 B2 | Page 1 of 1 |
| APPLICATION NO. | : 11/496866 | |
| DATED | : November 23, 2010 | |
| INVENTOR(S) | : John Stauffer et al. | |

It is certified that error appears in the above-identified patent and that said Letters Patent is hereby corrected as shown below:

In column 8, line 25, delete "cyclicly" and insert -- cyclically --, therefor.

Signed and Sealed this
Twenty-fifth Day of October, 2011

David J. Kappos
*Director of the United States Patent and Trademark Office*